Dec. 28, 1954  J. A. PECK  2,698,215
INSTRUMENT FOR MEASURING AND RECORDING THE ROTATIONAL
VELOCITY OF BOMBS WHILE IN FLIGHT
Filed May 11, 1951
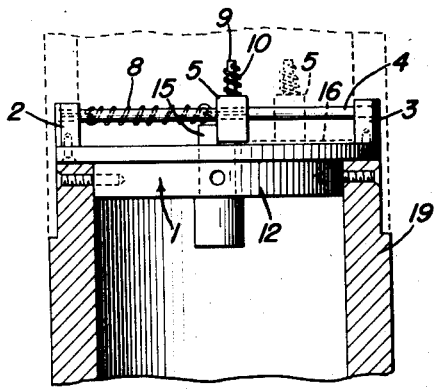
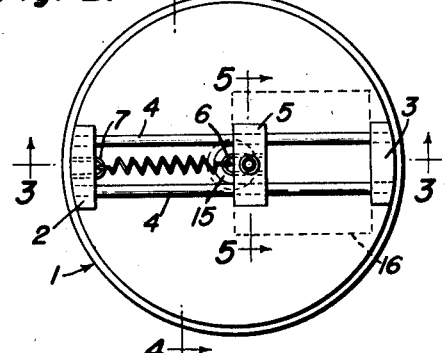
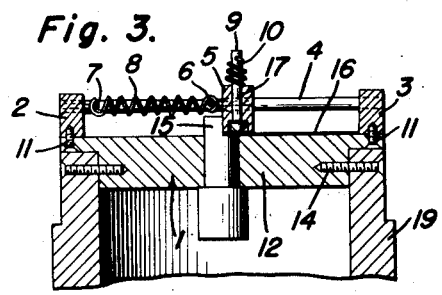
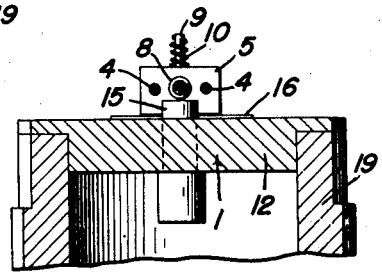
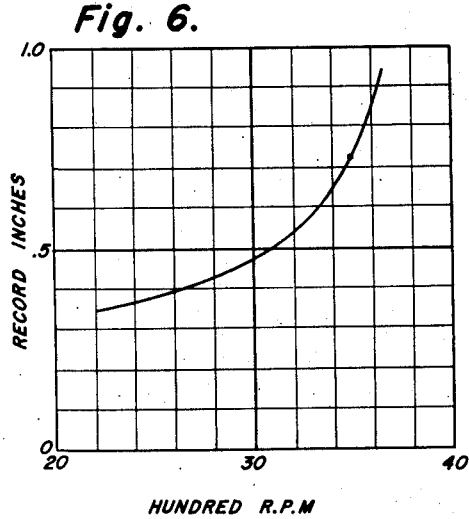
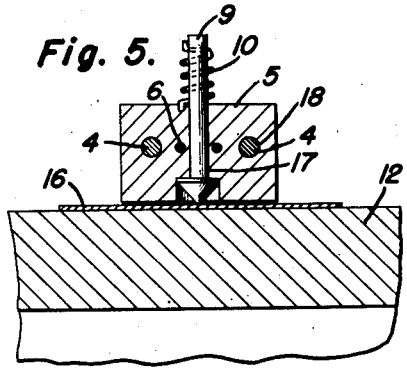
INVENTOR
JOSEPH A. PECK, DECEASED
BY ALLEN S. PECK, EXECUTOR
BY
ATTORNEY

United States Patent Office 2,698,215
Patented Dec. 28, 1954

2,698,215

INSTRUMENT FOR MEASURING AND RECORDING THE ROTATIONAL VELOCITY OF BOMBS WHILE IN FLIGHT

Joseph A. Peck, deceased, late of Worcester, Mass., by Allen S. Peck, executor, Worcester, Mass., assignor to the United States of America as represented by the Secretary of the Army Application May 11, 1951, Serial No. 225,801

1 Claim. (Cl. 346—7)

This invention relates to an instrument for measuring the rotational velocity of falling bombs. More particularly, it refers to an instrument comprising a centrifugal weight which is actuated by the rotation of the bomb in its fall and which registers the position of the weight on impact. In drop-testing new bomb designs having tail vanes which impart a rotative impulse to the bomb, it is important to determine certain characteristics such as velocity and R. P. M. of the falling bomb.

The object of the present invention is to provide a mechanism for determining the rotative speed of a falling bomb. A further object is to determine the maximum rotative speed and to automatically register such speed on a paper record at the moment of impact.

In the drawings, Fig. 1 shows a side view of the structure; Fig. 2 shows a top view of the same structure; Fig. 3 shows a section side view along 3, 3. Fig. 4 shows a sectional side view along 4, 4. Fig. 5 shows a sectional view along 5, 5 and Fig. 6 shows a graph of the calibration of the instrument. Fig. 7 shows a rotating bomb assembly with the recorder in position in the bomb.

More particularly, 1 is the base plate on which the recorder is positioned, 2 is the front end guide support block, 3 is the rear end guide support block, 4 are guide bars, 5 is the sliding centrifugal weight, 6 is the spring yoke on the sliding weight, 7 is the spring yoke on the front end guide support block, 8 is the spring connecting the two yokes, 9 is the stylus pin shown in detail in Fig. 5. 10 is the stylus pin spring, 11 are screws holding the two guide support blocks on the base plate, 12 is the narrow portion of the base plate, 14 are screws for attaching the recorder to the bomb body, 15 is a stop for the sliding centrifugal block, 16 is the recording paper beneath the stylus, 17 is the recessed hole in the sliding weight. 18 are holes through the sliding weight and 19 is a section of the bomb body.

The instrument is assembled on the base plate 1 and this base plate in turn is attached to the bomb body by inserting the narrow section 12 into the cylindrical portion of the bomb with screws 14 holding it in place.

The registering portion of the instrument consists of the weight 5 which is slidably fitted on the two parallel guide bars 4, 4. These bars are held in place by the end blocks 2 and 3. The spring 8 is attached to the yokes 6 and 7 and serves to bias the weight 5 against the stop 15. The sliding weight 5 is fitted with a central bore 17 which is relieved at one end to admit the stylus pin 9 in a sliding relationship. The spring 10 serves to hold the pin 9 in contact with the wax record paper 16.

When the bomb falls and begins to rotate, the weight 5, having its center of gravity on one side of center, will be urged outward by centrifugal force against the tension of the spring 8. The distance traversed by the weight will be proportional to the speed of rotation of the bomb. When the bomb strikes and suddenly stops, the inertia of the pin 9 plus the tension of spring 10 is sufficient to puncture the record paper making a dot at the point of impact. The position of this dot determines the R. P. M. of the bomb on impact.

It will be obvious to one skilled in the art that several modifications of the disclosed structure are possible. It is essential only that a sliding or pivoted weight be spring biased toward the center of the bomb and that said weight be equipped with a means for marking its position at the time of impact.

In order that the record made shall be translated into actual R. P. M. it is necessary to first calibrate the instrument. This is accomplished by rotating the instrument in a chuck or other suitable holder while in a vertical position. A curve of the calibration of this instrument is shown in Fig. 6. In this illustration, the ordinate represents the distance that the sliding weight moves under the influence of centrifugal force and the abscissa represents the corresponding R. P. M.

By proper positioning and fastening of the record paper under the stylus, the latter will trace a straight line which ends in a dot or hole. The length of this line is measured and read off on the ordinate of the graph. The corresponding abscissa is the desired R. P. M. To make the reading of the length of the line on the record paper easier, it is convenient to puncture the paper at the beginning of the line by tapping the pin 9. In this manner, there will be a punctured hole at the beginning as well as at the end of the line, thereby making the determination of its length correspondingly easier.

What is claimed is:

In combination, a bomb having a tail shaped to impart rotation to the bomb body, a recording instrument whose vertical axis coincides with the longitudinal axis of the bomb, said recording instrument comprising a base, guide means on said base, a moving weight on said base, said weight confined in its motion by said guide means, spring means biasing said weight toward the center of the base, a stylus on said weight, spring means biasing said stylus against a record paper positioned on the base under said stylus, said stylus having a mass and spring bias sufficient to make an impression on the recording paper when the bomb strikes.

References Cited in the file of this patent

UNITED STATES PATENTS

| Number | Name | Date |
|---|---|---|
| 1,698,576 | Baskerville | Jan. 8, 1929 |
| 2,163,847 | Perrey | June 27, 1939 |
| 2,409,537 | Bright | Oct. 15, 1946 |
| 2,613,125 | Brown | Oct. 7, 1952 |

FOREIGN PATENTS

| Number | Country | Date |
|---|---|---|
| 517,446 | Great Britain | Jan. 30, 1940 |